United States Patent Office 3,179,670
Patented Apr. 20, 1965

3,179,670
MONO(TRIFLUOROMETHYL)-SUBSTITUTED
2,2'-ALKYLIDENEBISBENZIMIDAZOLES
Joseph J. Ursprung, Portage, Mich., assignor to The Upjohn Company, Kalamazoo, Mich., a corporation of Delaware
No Drawing. Filed June 24, 1964, Ser. No. 377,531
8 Claims. (Cl. 260—309.2)

This application is a continuation-in-part of application Serial No. 156,125, filed November 30, 1961 (now abandoned).

This invention pertains to novel organic compounds, and is more particularly directed to mono(trifluoromethyl)-substituted 2,2'-alkylidenebisbenzimidazoles and the acid addition salts thereof.

The novel compounds of the invention are selected from the class consisting of (a) the compound of the formula:

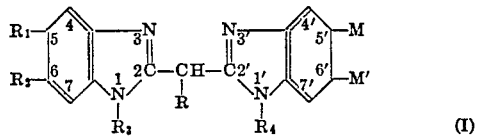

wherein R, $R_3$ and $R_4$ are selected from the class consisting of hydrogen and alkyl of from 1 to 6 carbon atoms, inclusive, for example, methyl, ethyl, propyl, butyl, amyl, hexyl, and isomeric forms thereof, $R_1$ and $R_2$ are alkyl of from 1 to 3 carbon atoms, inclusive, i.e., methyl, ethyl, propyl, and isopropyl, and one of M and M' is trifluoromethyl (—$CF_3$), the other being hydrogen, and (b) acid addition salts thereof.

The novel mono(trifluoromethyl)-substituted 2,2'-alkylidenebisbenzimidazoles of this invention exhibit pharmacological activity, and they can be used as diuretics and sedatives in mammals. In addition, the mono(trifluoromethyl)-substituted 2,2'-methylenebisbenzimidazoles of this invention are valuable intermediates and can be substituted for di(2-benzimidazolyl)-methane in the process described in U.S. Patent 2,697,712 for the preparation of 1,1,2,2-tetra(2-benzimidazolyl)-ethylene coloring compounds.

The novel compounds of the invention having the Formula I can be prepared in a convenient manner as follows:

(a) A 4,5 - dialkyl - 1,2 - phenylenediamine of the formula:

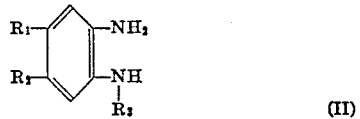

wherein $R_1$, $R_2$ and $R_3$ are as defined hereinbefore, is condensed with an acid addition salt of a carbalkoxyacetimino alkyl ether, illustratively, a carbalkoxyacetimino alkyl ether hydrohalide, e.g.,

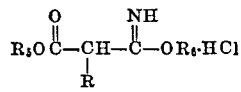

wherein $R_5$ and $R_6$ represent alkyl groups, preferably ethyl, and R is as defined hereinbefore, to form the corresponding alkyl 2-(5,6-dialkyl-2-benzimidazolyl)alkanoate according to the following equation:

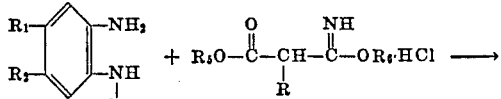

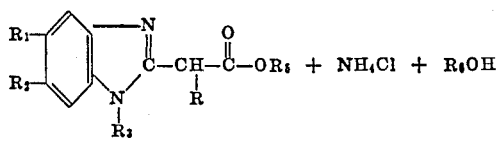

The reaction is carried out advantageously by bringing the reactants together in substantially equimolar proportions in the presence of an inert solvent, illustratively, a lower alkanol such as methanol, ethanol, isopropanol, and the like. For convenience, it is preferable to carry out the reaction at elevated temperatures such as the boiling point of the inert solvent, but ordinary temperatures can be employed if desired. Generally speaking, the reaction is carried out advantageously at a temperature within the range of about 20° C. to about 150° C. and preferably within the range of about 35° C. to about 105° C.

The desired compound is isolated from the reaction mixture by conventional procedures, for example, by dilution of the reaction mixture with water, followed by basification of the solution and isolation of the precipitate by filtration. The compound so obtained can be purified by conventional procedures, for example, by recrystallization.

(b) The alkyl 2 - (5,6 - dialkyl-2-benzimidazolyl)alkanoate so obtained is then condensed with a substituted 1,2-phenylenediamine of the formula:

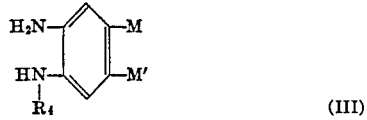

wherein M, M', and $R_4$ are as defined hereinbefore, to obtain the compound represented by Formula I, above. The reaction is carried out conveniently by heating the reactants together alone or, if desired, in the presence of an inert solvent such as trichlorobenzene, decalin, tetralin, and the like. Preferably, the reaction is carried out in the presence of an inert solvent at a temperature within the range of about 150° C. to about 250° C. and preferably within the range of about 175° C. to about 225° C. The reactants are employed advantageously in substantially equimolar proportions. Generally speaking, the desired compound having the Formula I separates on cooling the reaction mixture and can be isolated therefrom by filtration. The compound so obtained can be purified by conventional procedures, for example, by recrystallization.

It will be appreciated that the above procedure can be varied by employing the phenylenediamine having the Formula III in stage (a) and the phenylenediamine having the Formula II in stage (b). That is to say, in a variation of the above process, stage (a) comprises the condensation of a phenylenediamine having the Formula III with an acid addition salt of a carbalkoxyacetimino alkyl ether to yield the corresponding alkyl 2-(trifluoromethyl- 2-benzimidazolyl)alkanoate. Stage (b) then comprises the reaction of the latter compound with a phenylenediamine having the Formula II to yield the compound having the Formula I.

The acid addition salts of the carbalkoxyacetimino alkyl ether base employed in stage (a) of the process described above are prepared by treating the corresponding alkyl α-cyanoalkanoate

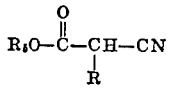

wherein R and $R_5$ are as defined hereinbefore, with the appropriate acid in the presence of the appropriate alkanol, $R_6OH$, wherein $R_6$ is as defined hereinbefore. For example, the hydrochloride of the carbalkoxyacetimino alkyl ether is prepared, advantageously, by passing anhydrous hydrogen chloride gas into a mixture of the alkyl α-cyanoalkanoate and the alkanol in solution in an inert solvent such as ether. Preferably, the reaction is carried out at a temperature of the order of 0° C. The alkyl α-cyanoalkanoate and alkanol are employed in substantially equimolar proportions and the desired hydrochloride separates from the reaction mixture. Generally speaking, the product so obtained is in a sufficient state of purity to be used without further treatment, but if desired, the compound can be purified by conventional procedures, for example, by recrystallization.

The 4,5-dialkyl-1,2-phenylenediamines having the Formula II, above, which are employed as starting materials in the above-described process are known in the art or can be prepared by methods which are well-known in the art. For example, the 4,5-dialkyl-1,2-phenylenediamines of the Formula II wherein $R_3$ is hydrogen, can be prepared by nitration of the corresponding 1,2-dialkylbenzenes to yield the corresponding 1,2-dialkyl-4-nitrobenzenes, reduction of the latter to the corresponding 3,4-dialkylaniline, conversion of the aniline so obtained to its urethane, nitration of the latter followed by hydrolysis to yield the corresponding 4,5-dialkyl-2-nitroaniline, and reduction of the nitro compound so obtained to yield the desired 4,5-dialkyl-1,2-phenylenediamine. The procedure involved in the above series of reactions is preferably that described by Lambooy, J. Am. Chem. Soc. 71, 3756, 1949, for the preparation of 4,5-diethyl-1,2-phenylenediamine.

The 4,5-dialkyl-1,2-phenylenediamines having the Formula II above, wherein $R_3$ represents lower-alkyl, which are employed as starting compounds in the above-described reaction, can be prepared by known methods, e.g., the method described in U.S. Patent 2,400,872, for the preparation of N-methyl- and N-ethyl-1,2-phenylenediamine.

The starting compound, 4-trifluoromethyl-1,2-phenylenediamine, is available commercially, and the N-alkyl-trifluoromethyl-1,2-phenylenediamines (compounds of Formula III wherein $R_4$ is alkyl) are prepared by methods known in the art. For example, an N-alkyl-4-trifluoromethyl-1,2-phenylenediamine, e.g., N-methyl-4-trifluoromethyl-1,2-phenylenediamine, is prepared by reacting 2-nitro-4-trifluoromethylaniline with p-toluenesulfonyl chloride to produce 2'-nitro-4'-trifluoromethyl-p-toluenesulfonanilide. The 2'-nitro-4'-trifluoromethyl-p-toluenesulfonanilide is reacted with an alkyl halide, e.g., methyl iodide, to produce 2'-nitro-4'-trifluoromethyl-N-methyl-p-toluenesulfonanilide which can be hydrolyzed with acid, e.g., 80% sulfuric acid at room temperature for 8 hrs., to produce N-methyl-2-nitro-4-trifluoromethylaniline. The N-methyl-2-nitro-4-trifluoromethylaniline thus obtained is then reduced to N-methyl-4-trifluoromethyl-1,2-phenylenediamine by conventional methods. In the same manner, N-alkyl-5-trifluoromethyl-1,2-phenylenediamines are produced, but starting with 2-nitro-5-trifluoromethylaniline (Rouche, Bull. sci. acad. roy. Belg. 13, 346–57, 1927; C.A. 22, 2149, 1928).

The acid addition salts of the invention comprise the salts of the compounds having the Formula I, above, with acids. The acid addition salts can be prepared by conventional methods. For example, the compound having the Formula I can be treated with at least a stoichiometric amount of the appropriate acid; and depending upon the nature of the solvent employed, the desired salt will separate spontaneously or can be precipitated by the addition of a solvent in which the salt is insoluble. A pharmacologically acceptable acid addition salt can be prepared using acids such as sulfuric, hydrochloric, hydrobromic, nitric, phosphoric, benzoic, p-toluenesulfonic, salicylic, acetic, propionic, tartaric, citric, succinic acids, and the like. Likewise, the compounds of this invention having Formula I above, can be reacted with fluosilicic acid in accordance with U.S. Patents 1,915,334 and 2,075,359, for preparing amine fluosilicate mothproofing agents, and in accordance with U.S. Patents 2,425,320 and 2,606,115 in preparing amine thiocyanate-formaldehyde condensation products for use as pickling inhibitors. The acid addition salts of this invention provide a convenient means for refining the free base, and any acid that will form the acid addition salt is suitable.

When used in therapy, the novel mono(trifluoromethyl)-substituted 2,2'-alkylidenebisbenzimidazoles of the invention can be formulated, as the essential active ingredient, in novel unit dosage compositions for administration via oral or parenteral routes. Suitably, the compositions comprise the essential active ingredient and a solid or fluid pharmaceutical carrier. Convenient solid pharmaceutical carriers for solid compositions includes, e.g., cornstarch, lactose, dicalcium phosphate, terra alba (calcium sulfate), talc, stearic acid, magnesium stearate, gums, and functionally similar materials. Suitable solid compositions include tablets, pills, capsules, granules, powders, wafers, and catchets. Fluid pharmaceutical carriers for fluid compositions advantageously comprise water; oils, for example, cottonseed oil, sesame oil, and peanut oil; and oil-water emulsions. Appropriate fluid compositions include solutions, suspensions, syrups, oil-water emulsions, and the like.

The following examples are illustratives of the process and products of the present invention, but are not to be construed as limiting.

EXAMPLE 1

*Preparation of 5,6 - dimethyl - 5' - trifluoromethyl - 2,2'-methylenebisbenzimidazole and the dihydrochloride thereof*

PART A.—2-CARBETHOXYACETIMINO ETHYL ETHER HYDROCHLORIDE

A solution of 113 g. (1 mole) of ethyl cyanoacetate in a mixture of 46 g. (1 mole) of anhydrous ethanol and 3 l. of anhydrous ether was stirred and cooled to 0° C. Anhydrous hydrogen chloride was passed into the cooled solution until the latter was saturated. The mixture was then stirred at 0° C. for a further 3 hrs. The solid which had separated was isolated by filtration, washed thoroughly with ether on the filter, and dried in vacuo. There was thus obtained 179 g. of 2-carbethoxyacetimino ethyl ether hydrochloride in the form of a white solid having a melting point of 111° to 113° C. (dec.).

PART B.—PREPARATION OF ETHYL 2-(5,6-DIMETHYL-2-BENZIMIDAZOLYL)ACETATE

A mixture of 6.8 g. (0.05 mole) of 4,5-dimethyl-1,2-phenylenediamine (Beilsteins Handbuch der Organischen Chemie, 13, 179, 4th edition, 1930), and 9.8 g. (0.05 mole) of 2-carbethoxyacetimino ethyl ether hydrochloride (Part A above) in 100 ml. of absolute ethanol was heated under reflux for 1 hr. To the cooled mixture was added 100 ml. of water, and the resulting slurry was made alkaline by the addition of aqueous ammonium hydroxide solution. The solid which had separated was isolated by filtration, washed thoroughly with water, and recrystallized from ethanol. There was thus obtained 8.0 g. of ethyl 2-(5,6-dimethyl-2-benzimidazolyl)acetate in the form of a crystalline solid having a melting point of 177° to 181° C.

PART C.—PREPARATION OF 5,6-DIMETHYL-5'-TRIFLUO-ROMETHYL - 2,2' - METHYLENEBISBENZIMIDAZOLE AND THE DIHYDROCHLORIDE THEREOF

A mixture of 4.64 g. (0.02 mole) of ethyl 2-(5,6-dimethyl-2-benzimidazolyl) acetate and 3.52 g. (0.02 mole) of 4-trifluoromethyl-1,2-phenylenediamine in 25 ml. of 1,2,4-trichlorobenzene was heated with stirring in an oil bath to 180° C. The reaction began at this temperature and the ethanol and water produced by the reaction were collected in a trap. As the reaction proceeded, the temperature was gradually increased to 210° C., and after 30 min. at this temperature, the theoretical amount of ethanol and water had accumulated in the trap. The reaction mixture was cooled slowly, and the 5,6-dimethyl-5'-trifluoromethyl - 2,2'-methylenebisbenzimidazole separated. The product thus obtained was suspended in hot ethanol and treated with a large excess of concentrated hydrochloric acid. The acidified mixture was kept hot for 15 minutes, and after allowing it to cool for 1 hr., there was obtained 5.7 g. of 5,6 - dimethyl - 5'-trifluoromethyl - 2,2'-methylenebisbenzimidazole dihydrochloride as fine needles having a melting point of 300° C. (dec.).

Analysis.—Calcd. for $C_{18}H_{17}Cl_2F_3N_4$: C, 51.81; H, 4.11; N, 13.43; Cl, 17.00. Found: C, 5.46; H, 3.93; N, 13.14; Cl. 16.62.

Following the same procedure but replacing hydrogen chloride by nitric, sulfuric, phosphoric, benzoic, p-toluenesulfonic, salicylic, acetic, propionic, tartaric, citric, succinic, fluosilicic, picric, oxalic and thiocyanic acid, there were prepared the corresponding 5,6-dimethyl-5'-trifluoromethyl-2,2'-methylenebisbenzimidazole dinitrate, sulfate, phosphate, dibenzoate, di-p-toluenesulfonate, disalicylate, diacetate, dipropionate, tartrate, citrate, succinate, fluosilicate, dipicrate, oxalate, and dithiocyanate, respectively.

EXAMPLE 2

*Preparation of 6'-trifluoromethyl - 1',5,6 - trimethyl - 2,2'-methylenebisbenzimidazole and the dihydrochloride thereof*

Following the procedure of Example 1, Part C, but substituting N-methyl - 5 - trifluoromethyl-1,2-phenylenediamine for 4 - trifluoromethyl - 1,2 - phenylenediamine, there were prepared 6'-trifluoromethyl-1',5,6-trimethyl-2,2'-methylenebisbenzimidazole and the dihydrochloride thereof.

EXAMPLE 3

*Preparation of 5,6-dimethyl - 1 - ethyl-5'-trifluoromethyl-2,2'-methylenebisbenzimidazole and the dihydrochloride thereof*

Following the procedure of Example 1, Part B, but substituting N-ethyl-4,5-dimethyl - 1,2-phenylenediamine for 4,5-dimethyl-1,2-phenylenediamine, there was prepared ethyl 2-(5,6-dimethyl-1-ethyl - 2 - benzimidazolyl) acetate, which was then reacted with 4-trifluoromethyl-1,2-phenylenediamine according to the procedure of Example 1, Part C, to obtain 5,6-dimethyl-1-ethyl-5'-trifluoromethyl-2,2'-methylenebisbenzimidazole and the dihydrochloride thereof.

EXAMPLE 4

*Preparation of 5,6-diethyl-5'-trifluoromethyl-2,2'-methylenebisbenzimidazole and the dihydrochloride thereof*

Following the procedure of Example 1, Part B, but substituting 4,5 - diethyl-1,2-phenylenediamine (Lambooy, supra) for 4,5-dimethyl-1,2-phenylenediamine, there was prepared ethyl 2 - (5,6-diethyl-2-benzimidazolyl)acetate which was then reacted with 4-trifluoromethyl-1,2-phenylenediamine according to the procedure of Example 1, Part C, to obtain 5,6-diethyl - 5' - trifluoromethyl-2,2'-methylenebisbenzimidazole and the dihydrochloride thereof.

EXAMPLE 5

*Preparation of 5,6-dimethyl - 5' - trifluoromethyl-2,2'-propylidenebisbenzimidazole and the dihydrochloride thereof*

Following the procedure of Example 1, Part A, but substituting ethyl α-cyanobutyrate (Alexander et al., J. Am. Chem. Soc. 66, 886, 1944) for ethyl cyanoacetate, there was prepared 2-carbethoxybutyrimino ethyl ether hydrochloride. Following the procedure of Example 1, Part B, but substituting 2-carbethoxybutyrimino ethyl ether hydrochloride for 2-carbethoxyacetimino ethyl ether hydrochloride there was prepared ethyl 2-(5,6-dimethyl-2-benzimidazolyl)butyrate. The latter compound was then condensed with 4-trifluoromethyl-1,2-phenylenediamine using the procedure described in Example 1, Part C, to obtain 5,6 - dimethyl-5'-trifluoromethyl-2,2'-propylidenebisbenzimidazole and the dihydrochloride thereof.

EXAMPLE 6

*Preparation of 5,6-dimethyl-5'-trifluoromethyl-2,2'-(2,4-dimethylpentylidene)bisbenzimidazole and the dihydrochloride thereof*

Following the procedure of Example 5, but substituting ethyl α-cyano-β,δ-dimethylcaproate (Alexander et al., supra) for ethyl α-cyanobutyrate, there were prepared 5,6-dimethyl - 5'-trifluoromethyl-2,2'-(2,4-dimethylpentylidene)bisbenzimidazole and the dihydrochloride thereof.

EXAMPLE 7

*Preparation of 5,6-dimethyl-1'-n-hexyl-5'-trifluoromethyl-2,2'-methylenebisbenzimidazole and the dihydrochloride thereof*

Following the procedure of Example 1, Part C, but substituting N-(n-hexyl)-4-trifluoromethyl - 1,2 - phenylenediamine for 4-trifluoromethyl-1,2-phenylenediamine, there were prepared 5,6-dimethyl-1'-n-hexyl-5'-trifluoromethyl-2,2'-methylenebisbenzimidazole and the dihydrochloride thereof.

EXAMPLE 8

*Preparation of 5,6-dimethyl-5'-trifluoromethyl-2,2'-ethylidenebisbenzimidazole and the dihydrochloride thereof*

Following the procedure of Example 5, but substituting ethyl α-cyanopropionate for ethyl α-cyanobutyrate, there were prepared 5,6-dimethyl-5'-trifluoromethyl-2,2'-ethylidenebisbenzimidazole and the dihydrochloride thereof.

EXAMPLE 9

Ten thousand (10,000) scored tablets for oral use, each containing 100 mg. of 5,6-dimethyl-5'-trifluoromethyl-2,2' - methylenebisbenzimidazole dihydrochloride were prepared from the following ingredients:

| | G. |
|---|---|
| 5,6 - dimethyl-5'-trifluoromethyl-2,2'-methylenebisbenzimidazole dihydrochloride | 1000 |
| Starch, U.S.P. | 170 |
| Talc, U.S.P. | 130 |
| Lactose, U.S.P. | 2600 |
| Sucrose powder, U.S.P. | 37 |
| Calcium stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form, are mixed well and then mixed with the dried lactose granules. The final mixture is then compressed into tablets, which are administered at the rate of 1 to 2 tablets 2 to 4 times daily.

I claim:
1. Compound selected from the group consisting of (a) the compound of the formula

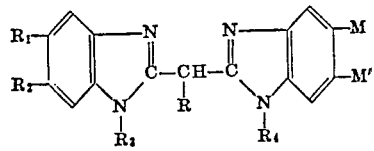

wherein R, $R_3$, and $R_4$ are selected from the class consisting of hydrogen and alkyl of from 1 to 6 carbon atoms, inclusive, $R_1$ and $R_2$ are alkyl of from 1 to 3 carbon atoms, inclusive, and one of M and M′ is trifluoromethyl, the other being hydrogen, and (b) acid addition salts thereof.

2. 5,6-dialkyl-5′-(trifluoromethyl) - 2,2′ - alkylidenebisbenzimidazole wherein alkyl is of from 1 to 3 carbon atoms, inclusive; and alkylidene is of from 1 to 6 carbon atoms, inclusive.

3. 5,6-dimethyl - 5′ - trifluoromethyl-2,2′-methylenebisbenzimidazole.

4. 5,6-dimethyl - 5′ - trifluoromethyl-2,2′-ethylidenebisbenzimidazole.

5. Acid addition salt of 5,6-dialkyl-5′-(trifluoromethyl)-2,2′-alkylidenebisbenzimidazole wherein alkyl is of from 1 to 3 carbon atoms, inclusive; and alkylidene is of from 1 to 6 carbon atoms, inclusive.

6. Pharmacologically acceptable acid addition salt of 5,6-dialkyl - 5′ - (trifluoromethyl)-2,2′-alkylidenebisbenzimidazole wherein alkyl is of from 1 to 3 carbon atoms, inclusive; and alkylidene is of from 1 to 6 carbon atoms, inclusive.

7. 5,6-dimethyl - 5′ - trifluoromethyl-2,2′-methylenebisbenzimidazole dihydrochloride.

8. 5,6-dimethyl-5′-trifluoromethyl - 2,2′ - ethylidenebisbenzimidazole dihydrochloride.

References Cited by the Examiner

UNITED STATES PATENTS 2,971,005   2/61   Engelhardt _____ 260—309.2

OTHER REFERENCES

Ford et al.: Antibiotic Medicine and Clinical Therapy, vol. 6, pages 461–9 (1959).

Wang et al.: Jour. Chem. Soc., vol. 79, pages 5706–11 (1957).

Wang: Synthesis of Bis Benzimidazoles as Potential Antimetabolites, pages 2, 13, and 31. Ann Arbor, University Microfilms, 1957.

Yale: Jour. Med. Pharm. Chem., vol. 1, pages 121–33 (1959).

Yale et al.: Jour. Amer. Chem. Soc., vol. 82, pages 2042–6 (1960).

WALTER A. MODANCE, *Primary Examiner.*

NICHOLAS S. RIZZO, *Examiner.*

UNITED STATES PATENT OFFICE
CERTIFICATE OF CORRECTION

Patent No. 3,179,670                                            April 20, 1965

Joseph J. Ursprung

It is hereby certified that error appears in the above numbered patent requiring correction and that the said Letters Patent should read as corrected below.

Column 1, lines 19 to 24, the formula should appear as shown below instead of as in the patent:

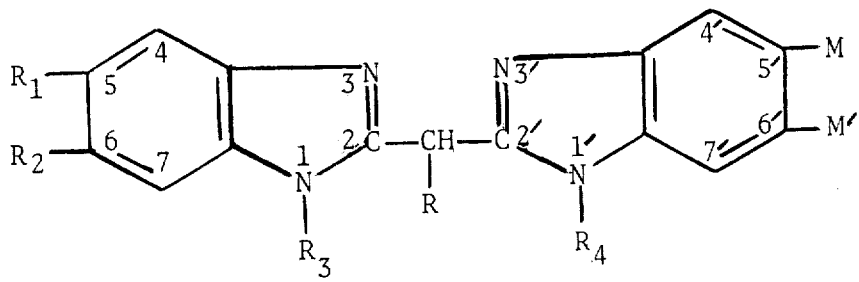

column 2, lines 9 to 14, the formula should appear as shown below instead of as in the patent:

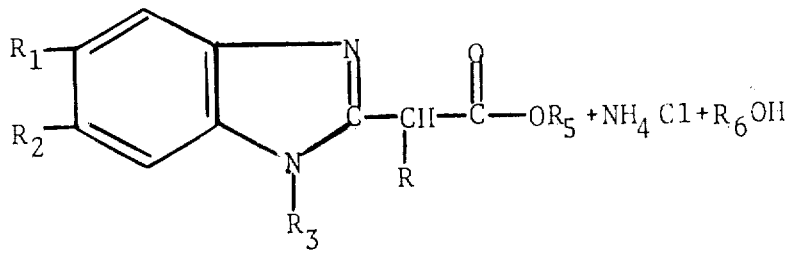

column 5, line 28, for "5.46" read -- 52.46 --; column 8, line 16, after "Jour." insert -- Amer. --.

Signed and sealed this 18th day of January 1966.

(SEAL)
Attest:

ERNEST W. SWIDER                                EDWARD J. BRENNER
Attesting Officer                               Commissioner of Patents